(12) United States Patent
Cogne et al.

(10) Patent No.: US 8,695,667 B2
(45) Date of Patent: Apr. 15, 2014

(54) METHOD OF MANUFACTURING A TIRE BEAD AND TIRE BEAD

(75) Inventors: Michael Cogne, Riom (FR); Laurent Nadreau, Vic le Comte (FR); Niclas Seidel, Chanat-la-Mouteyre (FR); Robert Veyret, Cebazat (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 224 days.

(21) Appl. No.: 13/131,692

(22) PCT Filed: Dec. 4, 2009

(86) PCT No.: PCT/EP2009/066394
§ 371 (c)(1),
(2), (4) Date: Sep. 12, 2011

(87) PCT Pub. No.: WO2010/072544
PCT Pub. Date: Jul. 1, 2010

(65) Prior Publication Data
US 2011/0315295 A1 Dec. 29, 2011

(30) Foreign Application Priority Data
Dec. 22, 2008 (FR) .................... 08 58894

(51) Int. Cl.
*B60C 15/00* (2006.01)
*B60C 15/06* (2006.01)
(52) U.S. Cl.
USPC ............ 152/539; 152/541; 152/543; 152/546
(58) Field of Classification Search
None
See application file for complete search history.

(56) References Cited

U.S. PATENT DOCUMENTS 4,941,523 A * 7/1990 Galante et al. ................ 152/543
5,164,029 A 11/1992 Oohashi et al.
(Continued)

FOREIGN PATENT DOCUMENTS

EP 1 186 699 A2 3/2002
JP 2002-363875 * 12/2002
(Continued)

OTHER PUBLICATIONS

Machine translation of KR 2002039983, 2002.*
(Continued)

*Primary Examiner* — Justin Fischer
(74) *Attorney, Agent, or Firm* — Dickinson Wright PLLC

(57) ABSTRACT

Method of manufacturing a tire comprising a carcass reinforcement extending between beads, this carcass reinforcement being anchored in each bead by being wrapped around each circumferential bead reinforcement to form a turned-back portion, this carcass reinforcement comprising at least one rubber ply which is reinforced with a plurality of metal cords of low or zero permeability, each bead comprising a plurality of rubber-based strips, at least one of these strips, known as the bead rubber strip, radially on the outside of the circumferential bead reinforcement performing a function of filling and mechanical connection between the carcass reinforcement and its turned-back portion, this bead rubber strip comprising a first surface axially towards the inside in contact with the carcass reinforcement and a second surface axially towards the outside, each bead further comprising at least one other strip, known as the filler strip which, radially on the outside of the radially outermost points of the turned-back portion of the carcass reinforcement is at least partly in contact with part of the second surface of the bead rubber strip to form a region of contact between the said two profiled elements this method comprising a step of forming a plurality of grooves on at least one of the surfaces of the strips that are in contact in the contact region, these grooves being distant from one another by at least a distance equal to 5 mm, and these first surface of the bead rubber strip being completely devoid of any groove.

7 Claims, 3 Drawing Sheets

(56) References Cited

U.S. PATENT DOCUMENTS

| | | |
|---|---|---|
| 2002/0053386 A1 | 5/2002 | Hirachi et al. |
| 2002/0166619 A1* | 11/2002 | Shimazaki .................... 156/123 |
| 2006/0000199 A1 | 1/2006 | Domingo et al. |
| 2006/0237110 A1 | 10/2006 | Barguet et al. |
| 2009/0199954 A1 | 8/2009 | Shino |

FOREIGN PATENT DOCUMENTS

| | | | |
|---|---|---|---|
| JP | 2003-039570 A | | 2/2003 |
| JP | 2004-36027 | * | 2/2004 |
| JP | 2004-190199 | * | 7/2004 |
| JP | 2006-346972 A | | 12/2006 |
| KR | 2002039983 | * | 5/2002 |
| SU | 1717410 | * | 3/1992 |
| WO | WO 2004/033798 A1 | | 4/2004 |
| WO | WO 2007/145284 A1 | | 12/2007 |
| WO | WO 2008/071157 A1 | | 6/2008 |

OTHER PUBLICATIONS

Machine translation of JP 2003-39570, 2003.*
French Search Report issued on Jul. 29, 2009 (with English translation of category of cited documents).

* cited by examiner

METHOD OF MANUFACTURING A TIRE BEAD AND TIRE BEAD

The invention relates to a method of manufacturing tires, and, more particularly, to a method of manufacturing tire beads. It also relates to the tires formed using such a method of manufacture.

In the field of heavy goods vehicle tires, it is known practice for the structure of a tire to be reinforced using a carcass reinforcement comprising metal reinforcements in the form of cords or assemblies of elementary threads. These reinforcements are positioned notably in a meridian direction within the tire which, in that case, is then known as a radial tire. What is meant here by a meridian direction is that each reinforcement is either contained or substantially contained within a plane containing the axis of rotation of the tire. A direction perpendicular to any meridian plane is a direction known as a circumferential direction.

A heavy goods vehicle tire comprises a crown region provided radially on the outside with a tread strip intended to come into contact with the road surface during driving. This crown region comprises a crown reinforcement radially on the outside surmounting the carcass reinforcement. Moreover, the crown region is extended laterally by sidewalls each ending in a bead, each bead being intended to come into contact with a rim for the mounting of the tire.

Because the manufacture of a tire passes through stages of assembling elementary products of the strip type with reinforcing elements (such as the carcass reinforcement, the crown reinforcement, etc.), air-filled spaces form between the various elementary products during the building of the tire. During the molding and vulcanizing operations carried out in a mould, the elementary products are brought into contact and the interfaces between these elementary products become smaller, that is to say that the occluded air is either directed towards the outside of the tire or spread through the regions of the tire in such a way that it is not detrimental to the correct performance of the said tire.

It was known that the assemblies or metal cords formed of a plurality of thin threads were calendered, that is to say were coated on both sides with an appropriate thickness of rubber compound. This calendering operation, performed cold or hot, was not, however, able to achieve complete penetration of the inside of the assembly. At least one channel in which air could move around was therefore created within each assembly. This channel had the advantage of allowing the occluded air to flow during the phases of manufacture and notably of molding.

However, once it had been molded and vulcanized, the tire still contained, within its carcass reinforcement assemblies, channels which served to concentrate the air which, along these channels, was able to arrive at regions of greater stress. This mechanism may be a factor that detracts from the fatigue endurance of the metal assemblies. The air arriving in these channels originates notably from the internal cavity of the tire to which the inflation pressure is applied, thus further increasing the possibility of its migrating into the carcass reinforcement.

One known solution is to increase the thickness of the butyl-based airtight compound positioned on the inside of the tire (namely between the tire and its internal cavity). However, this solution is expensive and can be further improved.

Another solution known per se is to use cords the air permeability of which is low or even zero. A cord is said to be impermeable to air when the air flow rate measured in a permeability test is low or zero. This permeability test involves taking a test specimen of cord from a carcass reinforcement and injecting air into one end of a length of this test specimen of cord (for example a 2 cm length) under pressure (1 bar) and measuring the volume of air at the other end of the said test specimen using a flow meter.

During the measurement, the test specimen of cord is immobilized in an airtight seal so that only the amount of air passing through the cord from one end to the other along its longitudinal axis is taken into consideration in the measurement. The higher the degree to which the rubber has penetrated the cord or the more tightly closed the structure of the cord, the lower the measured flow rate. This method is a simple way of indirectly measuring the extent to which a rubber compound has penetrated the cord.

One way of obtaining a cord of low or zero permeability is to impregnate it to its core, that is to say between all the elementary threads of which it is composed, with a rubber compound so as to completely eliminate the presence of channels.

However, the use of this type of cord with low or zero permeability prevents any air occluded during the phase of assembling the elementary products of the tire from circulating so that it can spread uniformly within the cords in order later to diffuse into the rubber compounds during the molding and vulcanizing phase.

This failure of the occluded air to diffuse leads to the formation of regions in which the elementary products of which the tire is composed are not bonded together, these regions of non-bonding concentrating the air which has not been able to be discharged and potentially leading to reductions in endurance performance.

The invention has set itself the task of avoiding these regions of concentration of occluded air so as to obtain improved endurance performance when using carcass reinforcement cords that have been impregnated with rubber to their core (see, for example, WO 2005-071157) or, more generally, cords of low or zero permeability.

To this end, there is described a method of manufacturing a tire comprising a crown region, sidewalls in the continuation on each side of the crown region, each sidewall ending in a bead intended to collaborate with a rim for the mounting of the tire, each bead comprising a circumferential reinforcement enveloped in a coating strip.

This tire further comprises a carcass reinforcement extending between the beads, passing through the sidewalls, this carcass reinforcement being anchored in each bead by being wrapped in part around each circumferential bead reinforcement to form a turned-back portion. This carcass reinforcement consists in at least one ply of rubber which ply has been reinforced with a plurality of metal cords of low or zero permeability oriented radially in the tire, each cord being formed of an assembly of a plurality of elementary threads.

Each bead comprises a plurality of rubber-based strips, at least one of these strips, known as the bead rubber strip, radially on the outside of the circumferential bead reinforcement performing a function of filling and mechanical connection between the carcass reinforcement and its turned-back portion, this bead rubber strip comprising a first surface axially towards the inside in contact with the carcass reinforcement and a second surface axially towards the outside, these two surfaces meeting in a line forming an apex of the points of the filler which are the radially outermost, these points of the apex being situated at a distance $D40$, measured in the meridian plane of section as being the distance from the apex of the bead rubber strip to the radially innermost point of the circumferential bead reinforcement. The first surface and the second surfaces are joined together by a third surface, this third surface providing contact with the circumferential bead reinforcement coating strip.

The turned-back portion of the carcass reinforcement is in contact with the second face of the bead rubber profiled element up to a distance D11 measured in the meridian plane of section as being the distance between the end of this turned-back portion and the radially innermost point of the circumferential bead reinforcement. This distance D11 is shorter than the distance D40.

Each bead moreover comprises at least one other strip known as the "filler strip" which, radially on the outside of the radially outermost points of the turned-back portion of the carcass reinforcement, is at least partially in contact with part of the second surface of the bead rubber strip so as to form a region of contact between the said two strips.

The method according to the invention involves creating, on at least one of the surfaces of the strips in contact, in the region of contact, a plurality of grooves of appropriate dimensions and which do not open onto the apex of the bead rubber strip, so as to allow air occluded in the bead during the steps of building the tire up to the molding and vulcanizing of the said tire to be drained away and spread out, the first surface of the bead rubber strip being entirely devoid of any groove. The grooves thus formed are distant from one another by a minimum distance of at least 4 mm, and preferably of at least 10 mm.

As a bead rubber strip is bounded by surfaces, a first surface axially towards the inside is defined, for this bead, as being a surface which turns out to be the closest to the internal cavity of the tire (in which the inflation pressure is applied) by comparison with the other surfaces of the same bead. A surface of a strip is said to be situated axially on the outside when this surface is furthest away from the internal cavity of the tire by comparison with the other surfaces of the same strip.

The applicants have found that it was essential, when using cords of low or zero permeability (notably cords that are rubberized to their core) for reinforcing the carcass reinforcement, not to form grooves on those parts of the bead rubber strip against which the said cords are in contact so as to avoid creating air-containing cavities, because this air might then be able to migrate towards the said cords and weaken them by locally modifying their surroundings.

Document JP-2003-039570 describes a method whereby a great number of striations with no spaces between them is formed on the axially internal and external surfaces of the bead rubber strip, these striations constituting reservoirs of air. Contrary to the teaching of that document, the applicants have surprisingly found that it was essential for plain regions devoid of any striation or groove and of a width at least equal to 4 mm and preferably at least equal to 10 mm to be formed between each of the grooves.

The person skilled in the art will adapt the geometry of these grooves and therefore the volume that can be used for collecting the occluded air to suit the dimension of the tire and the amount of air that could potentially become occluded. The volume of the grooves thus formed on the interface between the bead rubber strip and the filler strip then allows the occluded air to be drained away along this interface and makes it possible to have an area for exchange with the strips that is large enough for the air occluded in the rubber strips to be spread and dispersed while at the same time having appropriate regions of bonding between the bead rubber and filler strips.

The grooves may be formed on just part of the surface of the bead rubber strip prior to the assembly of the components of the tire and therefore prior to molding and vulcanizing, this surface corresponding to the surface which is not in contact with the carcass reinforcement and its turned-back portion, allowing the majority of the volume of occluded air to be collected and at the same time distributed over this part of the surface. Specifically, what happens is that under the action of the molding pressure, the air surrounding the carcass reinforcement and a great number of strips of which the bead is made up is driven towards the end parts of the turned-back portion of the carcass reinforcement. Thanks to the grooves thus formed, it is possible for the air occluded in each bead to be concentrated and spread over a large area.

The grooves are formed on the strip in the raw, i.e. unvulcanized, state and have cross-sectional profiles which may, when viewed in cross section, have varying shapes such as a triangular shape or rectangular shape.

The present invention is not seeking to discharge the occluded air, as was the objective in the documents of the prior art, but is seeking to break up the volume of occluded air by distributing it into the grooves formed in a region out of contact with the cords of the carcass reinforcement while at the same time ensuring good contact between the bead rubber strip and the filler strip. This occluded air then being dispersed into the materials that make up the bead rubber and filler strips rather than into the carcass reinforcement or its turned-back portion.

In another advantageous alternative form, the grooves are formed on the filler strip at least in the part in contact with the bead rubber strip.

It is of course essential, bearing in mind the nature of the cords of low or zero permeability, not to have grooves at the interface between the carcass reinforcement and the bead rubber strip, this being so as to avoid having regions of lower adhesion and avoid any later migration of the occluded air held in these grooves towards the reinforcing elements of this reinforcement. This is why the teaching of patent JP2006-346972 which discloses a bead rubber strip provided on all of its walls with a plurality of grooves is not relevant to solving the problem presented by the use of a carcass reinforcement the reinforcing elements of which are, for example, rubberized to their core.

More preferably still, the interface between the turned-back portion of the carcass reinforcement and the very same bead rubber strip is devoid of grooves.

The invention also relates to a tire manufactured according to the method of manufacture of the invention and which leads to the obtaining of a bonding interface between the bead rubber strip and the filler strip that comprises a plurality of imbrications of one of these two strips in the other strip, these imbrications being spaced from one another by a distance at least equal to 4 mm or preferably of at least 10 mm. These imbrications correspond substantially to the profiles of the grooves formed on at least one of the bead rubber or filler strips.

Other features and advantages of the invention will emerge from the description given hereinafter with reference to the attached drawings which, by way of nonlimiting examples, show some embodiments of the subject matter of the invention.

FIG. 1 shows a section through a heavy goods vehicle tire according to the invention;

FIG. 2 shows an enlarged section through a bead of a tire according to the invention;

FIG. 3 shows the bead rubber strip used to manufacture the bead shown in FIG. 2;

FIG. 4 shows an alternative form of a bead rubber profiled element in which the grooves are formed as a helix on part of the wall of the bead rubber strip;

FIG. 5 shows an alternative form of a bead rubber strip according to the invention, comprising a plurality of circumferential grooves and of radial grooves.

To make the document easier to read, one and the same reference is used for all the figures a description of which follows, when this reference indicates an element that has the same structure and the same function.

DEFINITIONS

The equatorial plane of the tire is a plane which is perpendicular to the axis of rotation of the tire and which divides the said tire into two half-tires. This equatorial plane notably contains the points on the tire that are radially furthest from the axis of rotation. The line of the equatorial plane is given by a line XX' in the figures and the axis of rotation is indicated by the line YY'.

A first point is said to be radially on the outside of a second point when this first point is at a distance from the axis of rotation which is greater than the distance of the second point from this axis of rotation.

A first point is said to be axially on the inside of a second point when this first point is, in a direction parallel to the axis of rotation, closer to the equatorial plane of the tire than the second point or, and this is equivalent, when this first point is closer to the internal cavity of the tire than is the second point (in the case of FIG. 1, the distance from the first point to the axis XX' is shorter than the distance from the second point to the same axis).

A meridian section through a tire is a section through the tire taken in a plane containing the axis of rotation of the tire YY'.

A circumferential direction here means a direction tangential at every point to a circle centered on the axis of rotation.

A radial direction here means a direction perpendicular to the axis of rotation YY'.

An axial direction here means a direction which is perpendicular to the radial direction and which is parallel to the axis of rotation YY' of the tire.

Figure 1:
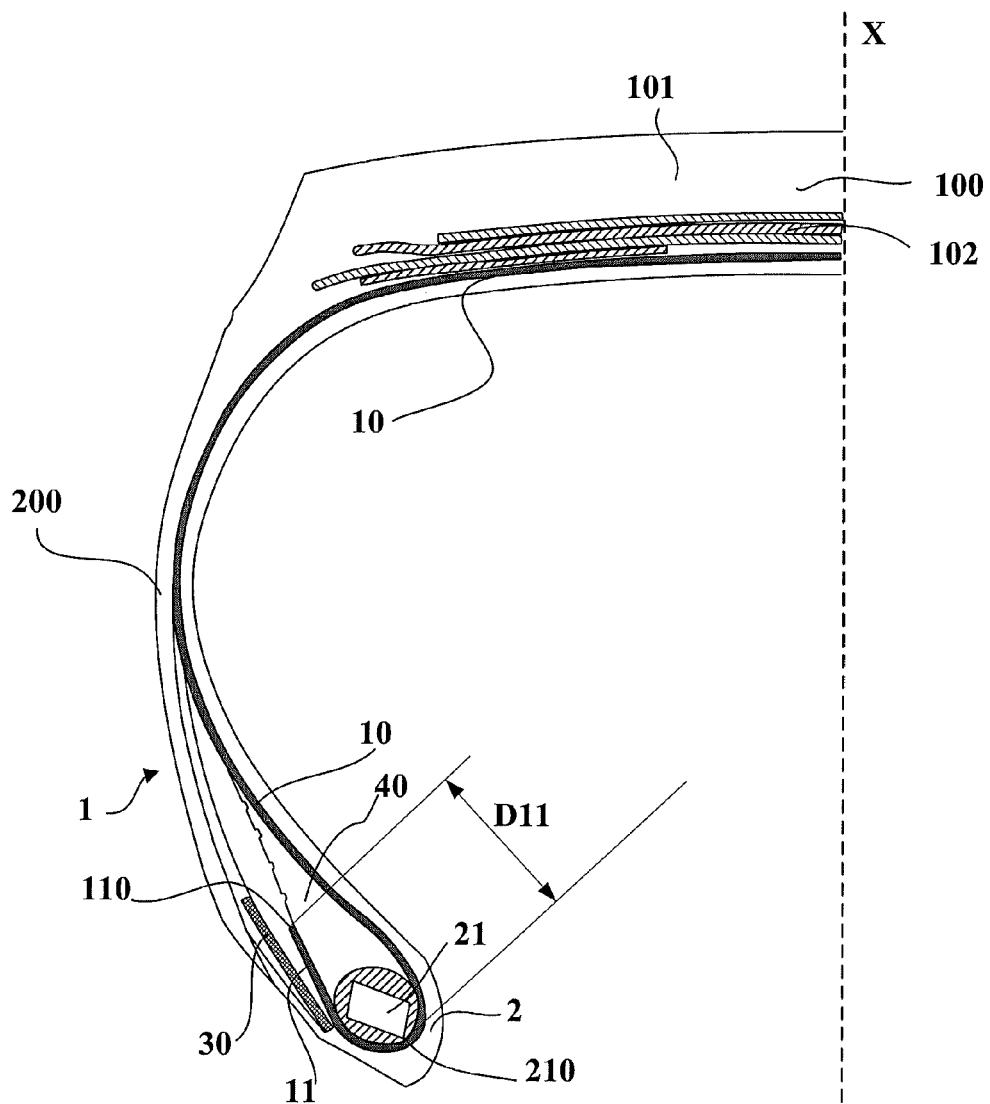
FIG. 1 shows a meridian section through half a tire 1 of size 315/70 R 22.5 for a heavy goods vehicle. The axis XX' intersects the axis of rotation YY' at right angles and indicates the radial direction; this axis XX' cuts the tire into two half-tires.

This tire 1 comprises a crown region 100 provided radially on the outside with a tread strip 101 intended to come into contact with the road surface during driving. This crown region 100 comprises a crown reinforcement 102 radially on the outside surmounting a carcass reinforcement 10. Moreover, the crown region is extended laterally by sidewalls 200 each ending in a bead 2, each bead being intended to be in contact with a rim for the mounting of the tire (the rim is not depicted here). Each bead comprises a circumferential reinforcement 21 around which the carcass reinforcement 10 is anchored to form a turned-back portion 11.

The carcass reinforcement 10 in this case described consists of a ply based on a rubber compound reinforced with metal cords of 19 threads 0.18 mm in diameter, these cords being penetrated to their core with rubber right from the time of manufacture of the said cords, that is to say even before they are incorporated into the said ply. This core penetration plugs the cords and prevents any air from circulating within them and gives these cords low or even zero permeability. In order to anchor the carcass reinforcement into the beads 2 of the tire, this ply is partially wrapped around the circumferential reinforcement 21 from the inside of the tire outwards to form a turned-back portion 11 that has an end 110 corresponding to the points of the turned-back portion that are the radially outermost in relation to the axis of rotation YY' of the tire. This end 110 is at a distance D11 from the radially innermost and axially innermost point 210 of the circumferential reinforcement 21. In the tire, the carcass reinforcing cords are oriented in such a way as to make an angle of or close to 90° with a circumferential direction. Here, the distance D11 is equal to 32 mm.

Moreover, this tire comprises an additional reinforcement 30 that reinforces the bead and is positioned axially on the outside of the turned-back portion 11 of the carcass reinforcement. Axially on the outside means in a direction parallel to the axis of rotation and directed towards the outside of the outside of the internal cavity of the tire in which the tire inflation pressure is applied. In this particular instance, this additional reinforcement comprises reinforcing elements (metal cords) oriented at a mean angle of 22° with respect to the circumferential direction.

Mechanical coupling between the carcass reinforcement and the turned-back portion is obtained thanks to the presence of a bead rubber strip 40 which rests against the bead wire strip 22.

Figure 2:
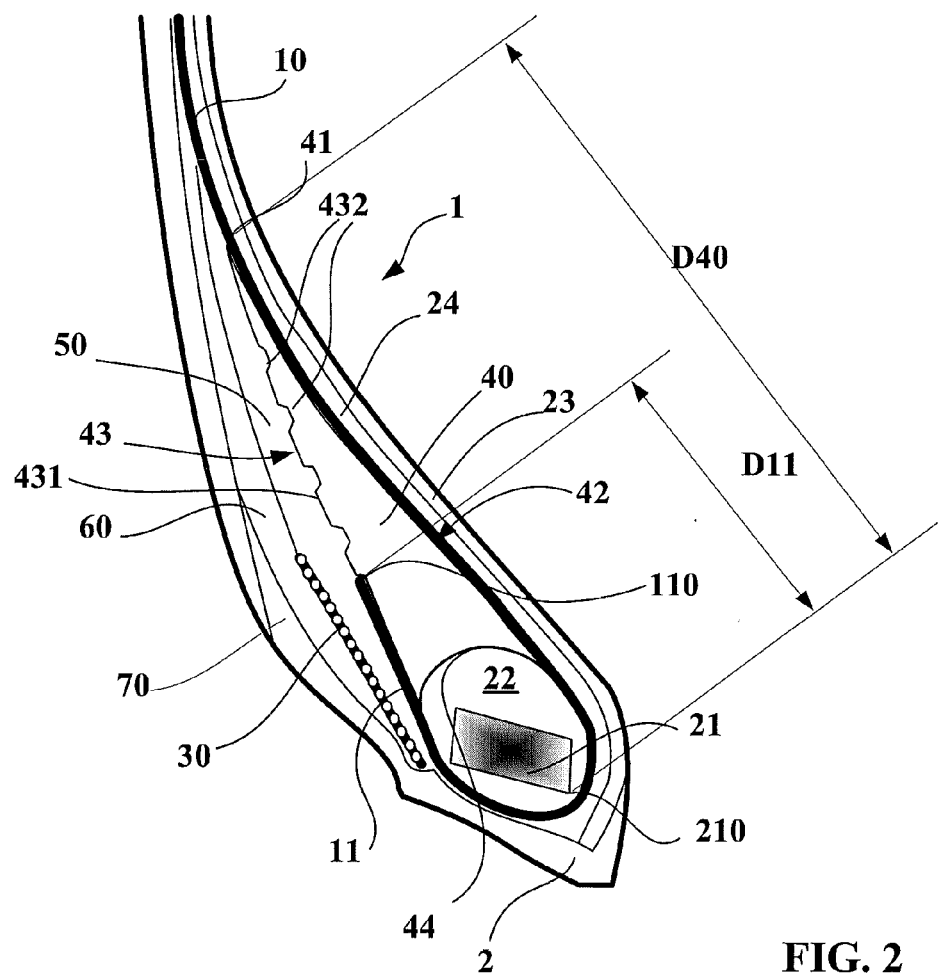

In the enlarged cross section of that same bead that is shown in FIG. 2, it is possible to distinguish the circumferential bead reinforcement 21, in this instance a bead wire of substantially rectangular cross section. This bead wire is surrounded by a bead wire strip made of rubber compound 22, around which the carcass reinforcement is wrapped from the inside of the tire outwards. Radially towards the outside, the bead wire strip 22 is extended by a bead rubber strip 40 which provides filling and mechanical coupling between the carcass reinforcement 10 and its turned-back portion 11. This bead rubber strip 40 of substantially triangular geometry terminates in an apex 41 of which the distance D40, measured with respect to the radially innermost and axially innermost point 210 of the bead wire is greater than the distance D11 of the end of the turned-back portion 11, measured in relation to the same point. In this particular instance, the distance D40 is equal to 75 mm.

Axially on the inside of the carcass reinforcement, it is possible to discern two layers of rubber compound, a first layer 23 formed of an airtight compound capable of maintaining the internal tire inflation pressure and of reducing the dispersal of air notably towards the carcass reinforcing elements. A second layer 24 provides the mechanical connection between the carcass reinforcement 10 and the first layer 23.

The bead rubber strip 40, viewed in the tire, comprises a first surface 42 axially towards the inside in contact with the carcass reinforcement 10, and a second surface 43 axially on the outside, these first and second surfaces meeting in a line that forms the tip 41 of the said bead rubber strip that is radially furthest towards the outside. These first and second surfaces are joined together by a third surface 44, this third surface 44 being in contact with the bead wire strip 22.

The bead further comprises at least one other strip known as the filler strip 50, which is interposed between the turned-back portion of the carcass reinforcement and the additional reinforcement 30. This filler strip 50 extends radially beyond the end of the turned-back portion so as to be in contact with a contact part 431 of the second surface of the bead rubber strip.

On this contact part 431 of the second surface of the bead rubber strip in contact with the filler strip 50 there may be seen filled grooves 432 forming imbrications of the material of the filler strip in the bead rubber strip, at the time of the tire molding operation, with the material of which the filler strip 50 is made (to simplify matters, in what follows, the terms groove and imbrication will be used interchangeably). With the exception of this contact part 431 of the second surface of the bead rubber strip 40, the other parts of the surface of the bead rubber strip and notably the first part 42 and the third part 44, are, in the raw state (that is to say during the tire manufacturing phases) free of any groove and of any hollow that could cause a local loss of adhesion between the carcass reinforcement and the said bead rubber strip, or air-filled cavities. In this particular instance, the grooves have a depth, measured on the unvulcanized strip, of 1.0 mm. For practical considerations this depth is advantageously at least equal to 0.8 mm and at most equal to 1.3 mm. The grooves have a width of between 1 mm and 1.7 mm and in this particular instance this width is equal to 1.2 mm on the unvulcanized strip.

Thanks to these grooves which run in the circumferential direction, that is to say in a circular direction concentric with the axis of rotation, it is possible for the air trapped in each bead at the time of manufacture of the tire to be drained and distributed effectively during the molding and vulcanizing operation thereby avoiding any buildup at any particular point. For preference, the grooves are spaced apart by a mean distance at least equal to 4 mm and more preferably still at least equal to 10 mm.

After the tire has been molded, a bonding interface between the bead rubber strip and the filler strip is obtained that comprises a plurality of imbrications spaced apart by a distance at least equal to 4 mm. These imbrications correspond substantially to the profiles of the grooves formed on the bead rubber strip in this particular instance.

These imbrications are formed by the profiles of the grooves into which the filler strip moulds itself, therefore forcing the occluded air to disperse into the rubbery materials of the bead rubber and filler strips. Each groove serves in a first stage of the manufacture of the tire, as a reservoir for a fraction of the occluded air and becomes filled with the material of the strip in contact during molding and vulcanizing.

Another cover strip 60 is positioned axially on the outside of the additional reinforcement 30 and is in partial contact with the filler strip 50. Finally, a further protective strip 70 is positioned to be in contact with a rim for the mounting of the tire and to form the radially and axially innermost part of the bead.

The example illustrated here with the support of FIGS. 1 and 2 is equivalent to the undepicted situation in which the grooves are formed not on the surface of the bead rubber strip but only on the part of the filler strip 50 that is in contact with the part of the bead rubber strip 40 radially beyond the end 110 of the turned-back portion 11 of the carcass reinforcement.

In another alternative form, grooves may be formed on the filler strip 50 and on the bead rubber strip 40 in the region of contact between these two strips. These grooves may also cross one another, and this encourages better circulation and distribution of the occluded air.

Figure 3:
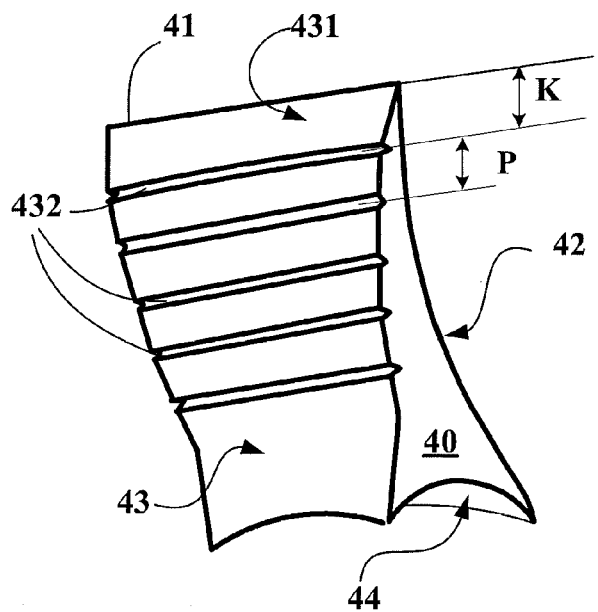

FIG. 3 shows the bead rubber strip 43 used in the manufacture of the tire shown in FIGS. 1 and 2. Discernable on part 431 of its second wall part 43 is a plurality of grooves 432 formed in circles concentric with the axis of rotation. These grooves 432 are formed at the time of the extrusion of the bead rubber strip 43. The distance P between two grooves here is the same irrespective of which grooves are considered and is equal to 6 mm. Advantageously, the part of the bead rubber strip which ends with the apex over a width K is entirely devoid of grooves so as to avoid concentrating the occluded air in a part of the bead rubber strip that is of small thickness because this occluded air could, having been dispersed into the material of the said bead rubber strip, migrate into the carcass reinforcement. For preference, this distance K is at least equal to 5 mm and more preferably still, at least equal to 10 mm.

Figure 4:
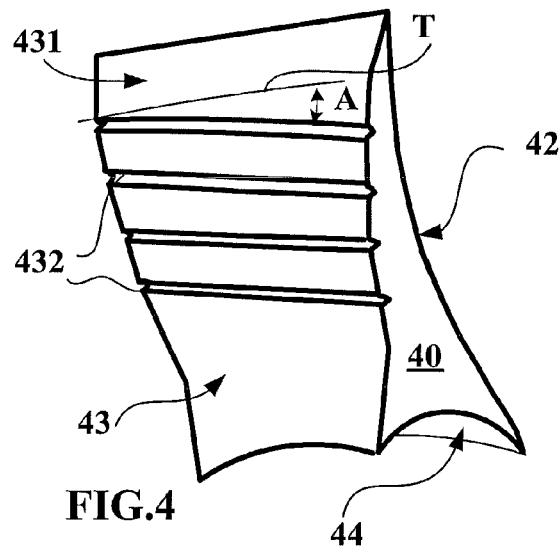

In an alternative form of the method shown in FIG. 4, a plurality of grooves 432 are formed on a part 431 of the second wall part of a bead rubber strip in the form of a helix, that is to say making a mean angle A other than zero with a circumferential direction (this circumferential direction is depicted by the straight line T). This arrangement makes it possible to ensure continuity of the drainage of the occluded air. In the case of this alternative form, the grooves do not open at the apex 41 of the bead rubber strip 43, the reason for this being to avoid creating a concentration of air at this end and therefore near the carcass reinforcing elements.

Figure 5:
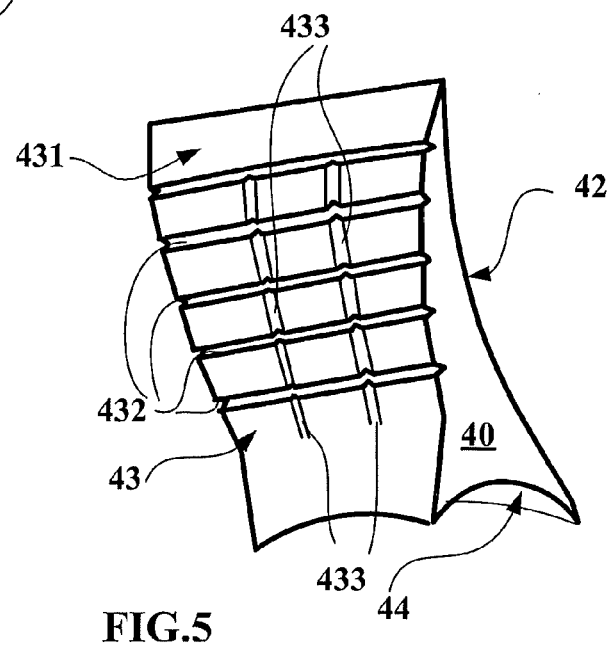

In another preferred alternative form shown in FIG. 5, the bead rubber strip 43 is provided on part 431 of its second wall part 43 with a plurality of circumferentially oriented grooves 432 and a plurality of radially oriented grooves 433 that intersect the circumferential grooves. The radial grooves 433 start at the end or near the end of the turned-back portion of the carcass reinforcement; their function is to allow better drainage of the occluded air towards the circumferential grooves. These grooves 433 could of course not be radial but could make an angle other than 90° to cross the circumferential grooves. These radial grooves 433 may extend between the turned-back portion of the carcass reinforcement and the bead rubber strip over an appropriate distance for improving the drainage of the occluded air towards the circumferential grooves 431.

In another alternative form that has not been depicted, the carcass reinforcement is provided on one of its faces, and more particularly on the face in contact with the bead rubber profiled element, with a plurality of textile threads that are not coated with rubber, each textile threads not adding any rigidity to the rigidity of the carcass reinforcement but serving, thanks to its inherent structure, as a drain for guiding and draining the air towards the grooves provided on part of the bead rubber strip, this part not being in contact with the carcass reinforcement or its turned-back portion.

In all the alternative forms set out, the cavities which act as reservoirs for draining and trapping the occluded air are in the form of continuous grooves. Of course any other kind of cavity and notably of discontinuous groove could be adopted, and these would, in the molded and vulcanized tire, form localized imbrications of one strip in another strip.

The invention is not restricted to the examples described and depicted and various modifications can be made thereto without departing from its scope. In particular, this invention applies to the manufacture of tires the carcass reinforcement of which is reinforced with textile reinforcements having low or zero air permeability.

The invention claimed is:
1. A method of manufacturing a tire that comprises:
a crown region,
sidewalls laterally extending each side of the crown region,
a bead at the end of each sidewall adapted to collaborate with a rim for the mounting of the tire, each bead comprising
a circumferential bead reinforcement, and
a plurality of rubber-based strips, comprising:
at least one strip, designated the bead rubber strip, which is disposed radially on the outside of the circumferential bead reinforcement, such bead rub- ber strip having a first surface axially towards the inside, or inward, and a second surface axially towards the outside, or outward, of the first surface, and at least one other strip, designated the filler strip, at least partly in contact with part of the second surface of the bead rubber strip, to form a region of contact between the filler strip and the second surface of the bead rubber strip, which region of contact is disposed radially on the outside of the radially outermost points of the turned-back portion of the carcass reinforcement, a carcass reinforcement extending between the beads, and passing through the sidewalls, this carcass reinforcement being anchored in each bead by being wrapped around each circumferential bead reinforcement to form a turned-back portion, and comprising at least one rubber ply which is reinforced with a plurality of metal cords of low or zero air permeability, wherein the bead rubber strip provides filling and mechanical connection between the carcass reinforcement and its turned-back portion, wherein the bead rubber strip comprises:
the first surface axially inward and in contact with the carcass reinforcement, and completely devoid of any grooves, and
the second surface axially outward of the first surface, wherein the first and second surfaces meet in a line forming an apex of the points of the bead rubber strip which are the radially outermost, wherein these points of the apex are situated a distance D40 from the radially innermost point of the circumferential bead reinforcement, wherein the turned-back portion of the carcass reinforcement is in contact with the second surface of the bead rubber strip up to a distance D11 measured as being the distance to the radially innermost point of the circumferential bead reinforcement, the distance D11 being shorter than the distance D40, wherein the area of contact between the second surface and the turned-back portion of the carcass reinforcement is devoid of grooves, and wherein the turned-back portion of the carcass reinforcement is in contact with the filler strip, this method comprising:
providing a plurality of grooves of appropriate dimensions, and having a mean distance between grooves of at least 4 mm, and which grooves do not open onto the apex of the bead rubber strip, in the region of contact between the filler strip and the second surface of the bead rubber strip situated radially beyond the turned-back portion of the carcass reinforcement, on at least one of the second surface of the bead rubber strip and the surface of the filler strip that is intended to be in contact with the second surface of the bead rubber strip in the contact region and allowing air occluded in bead to drain away and spread until such time as the tire is molded and vulcanized.

2. The method of manufacturing a tire according to claim 1, wherein the mean distance between the grooves is at least equal to 10 mm.

3. The method of manufacturing a tire according to claim 1, wherein the providing a plurality of grooves comprises providing part of the second surface of the bead rubber strip with a plurality of grooves oriented essentially circumferentially.

4. The method of manufacturing a tire according to claim 3, wherein is the providing a plurality of grooves further comprises forming another plurality of grooves that cross the plurality of circumferential grooves.

5. The method of manufacturing a tire according to claim 1, further comprising providing at least part of the surface of the filler strip in contact with the turned-back portion of the carcass and the bead rubber strip with a plurality of grooves, the width of these grooves being at least equal to 0.5 mm and at most equal to 2 mm, the depth being at least equal to 0.5 mm and at most equal to 2 mm.

6. A tire for a heavy goods vehicle obtained by a method of manufacture according to claim 1, wherein the interface for contact between the bead rubber strip and the filler strip comprises a plurality of imbrications of one of these two strips in the other strip, these imbrications having, when viewed in section, a shape and orientation that corresponds substantially to the grooves initially formed on one of the strips, the distance between these imbrications being at least equal to 4 mm.

7. The tire for a heavy goods vehicle according to claim 6, wherein each cord of the carcass reinforcement is formed of a plurality of metal threads, these threads being assembled with one another to form a cord and wherein at least the threads on the inside of the assembly are coated with a rubber compound, and wherein the metal cords are of low or zero air permeability.

* * * * *